UNITED STATES PATENT OFFICE.

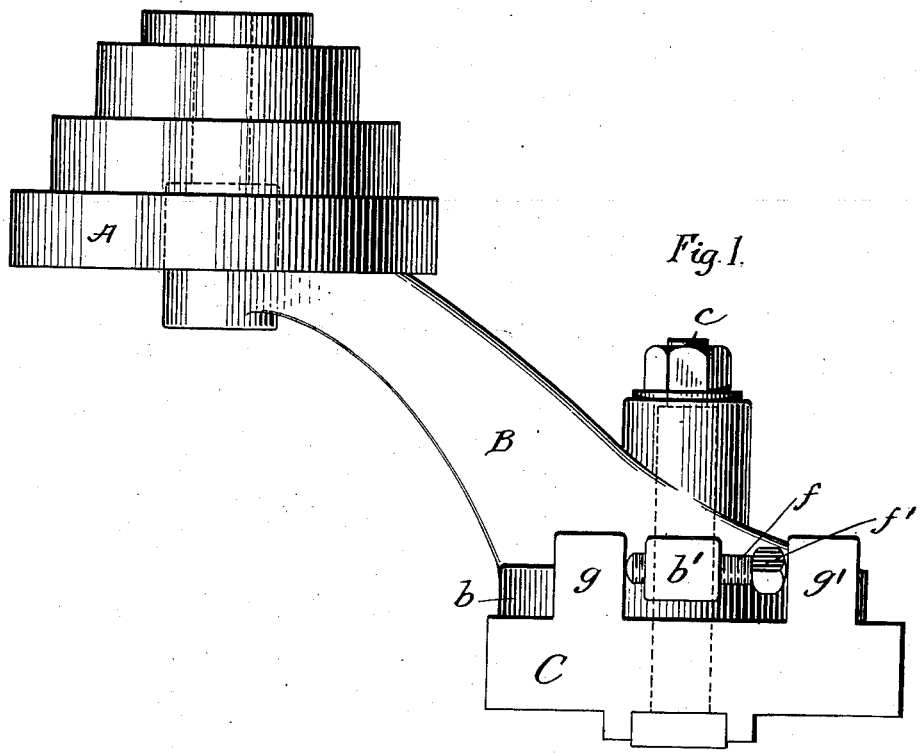
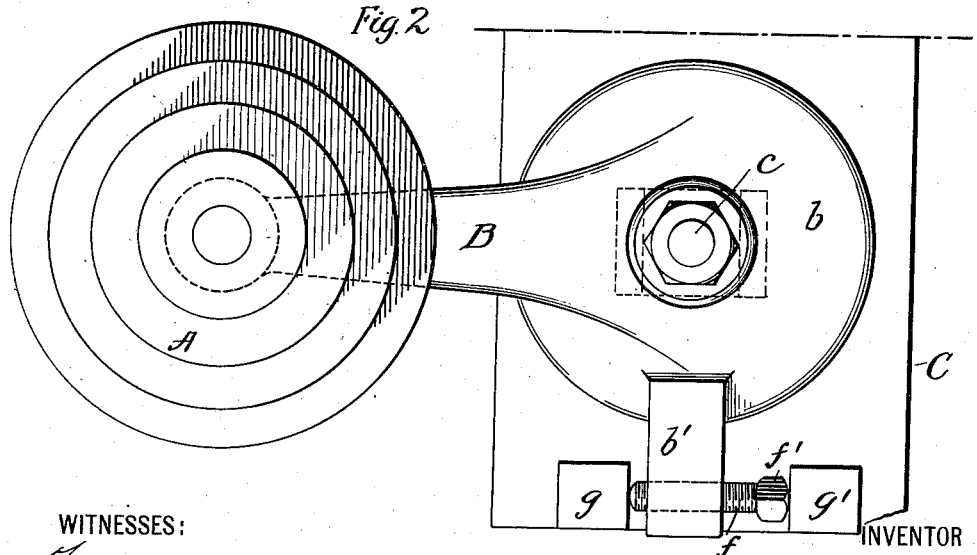

EDWARD J. McCLELLAN, OF NEW YORK, N. Y., ASSIGNOR TO THE GARVIN MACHINE COMPANY, OF NEW YORK.

BELT-TIGHTENER.

SPECIFICATION forming part of Letters Patent No. 655,157, dated July 31, 1900.

Application filed June 6, 1900. Serial No. 19,212. (No model.)

*To all whom it may concern:*

Be it known that I, EDWARD J. McCLELLAN, a citizen of the United States, residing at the city of New York, borough of Manhattan, State of New York, have invented certain new and useful Improvements in Belt-Tighteners, of which the following is a full, clear, and exact description.

This invention relates to belt-tighteners of that class in which one of the pulleys carrying the belt is adjusted with respect to the other.

The object of the invention is to provide means whereby the adjustment can be effected in the simplest manner and when once set will be positively maintained in position.

The invention consists in mounting the movable pulley at the upper end of a pivoted bracket or arm, the pivotal end of which is provided with a radial lug through which passes a threaded bolt, the extremities of which stand between and bear against two fixed lugs. By rotating the bolt the lug on the bracket is forced to traverse it in a longitudinal direction, and thereby correspondingly shift the bracket.

The invention will be described in detail with reference to the accompanying drawings, in which—

Figure 1 is a front elevation of the belt-tightener, and Fig. 2 is a plan thereof.

A indicates a pulley, which may be a cone-pulley, as shown, or a straight pulley.

B indicates a bracket-arm, in the unsupported end of which the pulley is mounted. The base of the bracket is formed into a circular plate $b$, which is swiveled centrally upon a stud $c$, secured to any kind of frame or support C. Projecting radially from the edge of the circular plate $b$ is a lug $b'$, through which passes in a direction parallel to the tangent of the plate a threaded bolt $f$, having a prismatic section $f'$ to receive a wrench by which it may be turned. The support or frame to which the bracket is pivoted is provided with two lugs $g$ and $g'$, with a space between them equal to the length of the bolt, and so located with respect to the circular plate $b$ that the bolt $f$ and lug $b'$ will stand between the lugs $g$ and $g'$ and with the ends of the bolt bearing against the respective lugs. It will now be seen that since the bolt is confined any rotation of it must compel the lug $b'$ to traverse it. In making this traverse the lug $b'$ swings from the center $c$, in consequence of which the bolt shifts slightly and rubs upon each of the lugs $g$ $g'$. For this reason the ends of the bolt should be rounded, as shown.

The operation of adjusting the pulley to either tighten or loosen the belt merely consists in applying a wrench to the bolt $f$ and turning it in one direction or the other the desired extent and then removing the wrench. The parts will remain fixed wherever adjusted, and the pulley will be positively held.

Having described my invention, I claim—

1. A belt-tightener consisting of a pivoted bracket provided with a radial lug in combination with a threaded bolt passing through said lug, and two fixed abutments between which the bolt is confined, substantially as described.

2. A belt-tightener consisting of a bracket-arm having a circular base-plate, a pivot centrally located in the base-plate, a lug projecting radially from the edge of said base, a threaded bolt passing through said lug in a direction parallel to a tangent of the plate, and two fixed stops between which the first-named lug and its bolt extends said bolt bearing at its respective ends against the two fixed lugs, substantially as described.

In witness whereof I subscribe my signature in presence of two witnesses.

EDWARD J. McCLELLAN.

Witnesses:
JOHN T. WILLIAMS,
CHAS. T. LUTHER.